United States Patent [19]

Melchior

[11] Patent Number: 4,938,121

[45] Date of Patent: Jul. 3, 1990

[54] PISTON FOR INTERNAL COMBUSTION ENGINES AND LIKE MACHINES

[76] Inventor: Jean F. Melchior, 126 Bld Montparnasse, Paris 14ème, France

[21] Appl. No.: 264,961

[22] PCT Filed: Feb. 22, 1988

[86] PCT No.: PCT/FR88/00097

§ 371 Date: Aug. 29, 1988

§ 102(e) Date: Aug. 29, 1988

[87] PCT Pub. No.: WO88/06250

PCT Pub. Date: Aug. 25, 1988

[30] Foreign Application Priority Data

Feb. 20, 1987 [FR] France ............................ 87 02203

[51] Int. Cl.$^5$ ............................................. F01B 31/00
[52] U.S. Cl. ....................................... 92/110; 92/157;
92/159; 92/187; 92/DIG. 1; 92/DIG. 2;
384/206; 384/300; 384/908
[58] Field of Search ................. 92/110, 113, 156, 157,
92/159, 186, 187, 188, 216, 255, 256, DIG. 1,
DIG. 2, DIG. 3, DIG. 4; 384/206, 300, 908

[56] References Cited

U.S. PATENT DOCUMENTS

| | | | |
|---|---|---|---|
| 878,783 | 2/1908 | Downie | 92/157 X |
| 1,258,967 | 3/1918 | Williams | 92/156 X |
| 1,294,538 | 2/1919 | Rose | 92/187 X |
| 1,637,765 | 8/1927 | Comstock | 92/157 |
| 2,297,649 | 9/1942 | Donaldson | 92/159 |
| 2,317,004 | 4/1943 | Wallgren et al. | 92/157 X |
| 2,380,907 | 7/1945 | Hall | 92/157 X |
| 3,053,595 | 9/1962 | Dilworth | 92/187 X |
| 3,126,613 | 3/1964 | Litsky | 384/206 |
| 3,342,513 | 9/1967 | Melton et al. | 287/90 |
| 4,031,868 | 6/1977 | Karaba et al. | 92/216 X |
| 4,043,255 | 8/1977 | Cunningham | 92/158 |
| 4,591,276 | 5/1986 | Schneider et al. | 384/206 |
| 4,674,164 | 6/1987 | McCidskey | 384/908 |

FOREIGN PATENT DOCUMENTS

| | | | |
|---|---|---|---|
| 0086164 | 8/1983 | European Pat. Off. | 384/206 |
| 965449 | 4/1948 | France . | |
| 1547151 | 12/1967 | France . | |
| 129962 | 8/1982 | Japan | 92/187 |
| 7906501 | 3/1981 | Netherlands | 92/187 |
| 293506 | 7/1928 | United Kingdom . | |
| 1111635 | 5/1968 | United Kingdom . | |

Primary Examiner—Robert E. Garrett
Assistant Examiner—Thomas Denion
Attorney, Agent, or Firm—Larson and Taylor

[57] ABSTRACT

The space within the interior cavity (7) of the piston (1) limited by the partially spherical head (5) of the connecting rod (6) is filled with a viscous, pasty or plastically ductile fluid (13), practically incompressible at the operating temperatures and pressures of the piston (1), the diameter (D) of the cylindrical support (8) which limits laterally the cavity (7) being very slightly greater than the diameter (d) of the partially spherical head (5) of the connecting rod (6) so that the clearance during operation between said support (8) and said head (5) is sufficiently minor to prevent any leakage of said fluid (13) from said space at the operating temperatures and pressures of the piston.

25 Claims, 6 Drawing Sheets

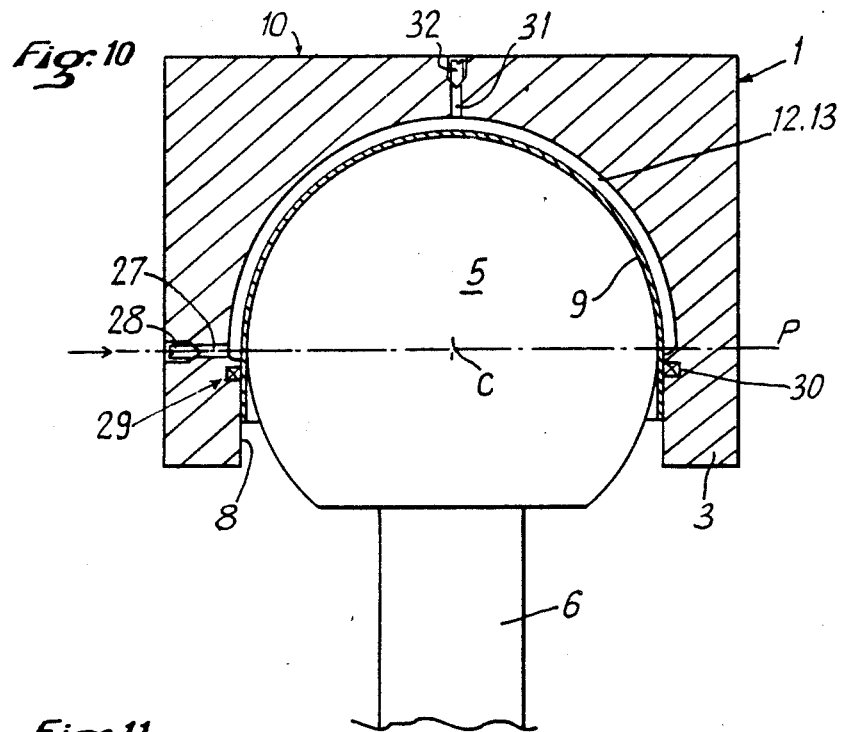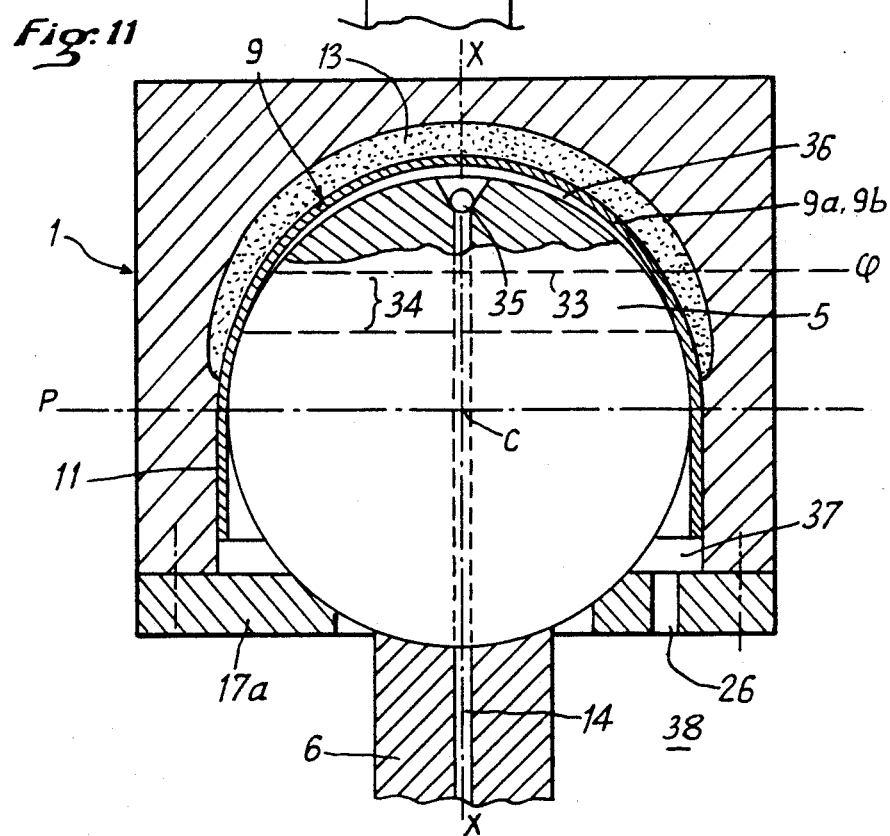

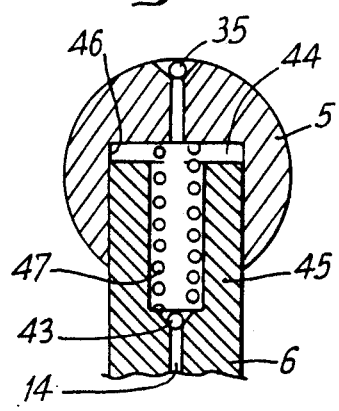
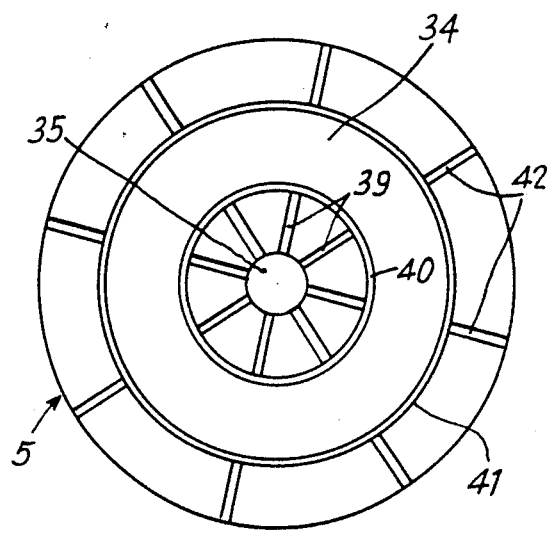
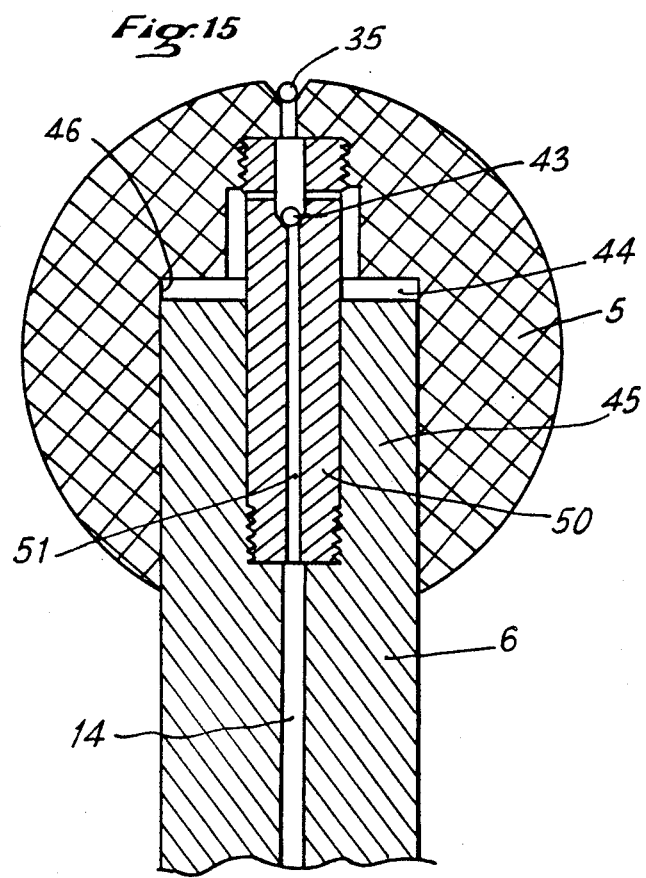

PISTON FOR INTERNAL COMBUSTION ENGINES AND LIKE MACHINES

The invention relates to pistons for sliding in cylinders of reciprocating internal or external combustion engines and compressors, i.e., machines in which a working gas contained in the or each cylinder by a transverse surface of the piston is at both high pressure and high temperature, and it preferably, but not exclusively, concerns pistons for two-stroke or four-stroke reciprocating internal combustion engines. The invention more particularly relates to those of these pistons which have, within an externally cylindrical skirt, a partly spherical bearing surface for receiving in the manner of a ball joint the partly spherical head of a connecting rod. For reasons which will be explained hereinafter, the bearing surface of the piston and/or the head of the rod may have by construction a shape which is partly not strictly spherical but, for simplifying the description, the expression "spherical" will be used in this context for designating a shape which is exactly or approximately spherical.

Such pistons are for example disclosed in French patents No. 965,449 and No. 1,547,151 and the British patent No. 293,506. In these known pistons, the two partly spherical elements of the piston and rod, which are composed of metal, move in contact with each other, at least if one ignores the thin film of lubricating oil maintained therebetween by introduction of oil under pressure which comes for example from a passageway extending longitudinally within the rod see in this respect French patent No. 965,449 and the British patent No. 293,506).

An object of the invention is to enable the articulation between the piston and the rod to resist large forces applied to the piston by the maximum pressures cyclically established in the variable-volume chamber defined by the piston inside the cylinder.

Hereinafter, when expressions such as "upper", "lower", "above" or "below" are used, it will be assumed that the piston is so oriented that its axis is vertical and the rod is positioned below the piston. This hypothesis is merely intended to simplify the description and therefore does not imply that the piston is in fact oriented in this way when it is mounted in an internal combustion engine or compressor.

According to a first aspect of the invention, the piston of the type defined hereinbefore is essentially characterized in that it possesses an inner cavity open at the end opposed to said transverse surface and laterally defined at least partly by a cylindrical bearing surface of revolution; the space defined within this cavity of the piston by the partly spherical head of the rod is filled with a viscous, pasty or plastically-deformable fluid which is practically incompressible at the operating pressures and temperatures of the piston; the diameter of said cylindrical bearing surface is very slightly larger than the diameter of the partly spherical head of the rod so that the operational clearance between said cylindrical bearing surface and partly spherical head is small enough to prevent any migration of said fluid out of said space at the operating temperatures and pressures of the piston.

Preferably, the generatrices of said cylindrical bearing surface are parallel to those of the cylindrical skirt of the piston, this cylindrical bearing surface being generally coaxial with this skirt.

In order to avoid any eventual loss of said fluid, a thin fluid-tight metal shell is advantageously interposed between the partly spherical head of the rod and said fluid and is locally maintained in position by an interference fit with said cylindrical bearing surface, the assembly being such that the part of the shell creating the interference with the cylindrical bearing surface is movable in a direction parallel to the axis of this cylindrical bearing surface under the effect of forces exceeding a given limit.

According to a second aspect of the invention, a piston provided for sliding in the cylinders of reciprocating internal or external combustion engines and compressors, i.e., machines in which a working gas contained in the or each cylinder by a transverse surface of the piston is at both high pressure and high temperature, in particular for four-stroke or preferably two-stroke reciprocating internal combustion engines, which piston receives in the manner of a ball joint the partly spherical head of a connecting rod, is essentially characterized in that it has, within an externally cylindrical skirt, a cavity which is open at the end opposed to said transverse surface and laterally defined at least partly by a cylindrical bearing surface of revolution, preferably coaxial with the piston; there is placed in said cavity a thin fluidtight metal shell whose shape is cylindrical in the lower part thereof and is an interference fit against the cylindrical bearing surface of revolution of the piston and substantially hemispherical in the upper part thereof against which the rod head bears; the metal shell defines, by the outer surface of the substantially hemispherical part thereof, within the cavity of the piston a space filled with a viscous, pasty or plastically-deformable fluid which is practically incompressible at the operating temperatures and pressures of the piston; the outside diameter of the partly spherical head of the rod is slightly less than the diameter of the cylindrical bearing surface of the piston so that the cylindrical part of the shell is an interference fit in the aforementioned manner and any migration of said fluid out of said space is prevented at the operating temperatures and pressures of the piston.

Preferably, said fluid is formed by a fluorine polymer and more particularly by PTFE (polytetrafluoroethylene) or "TEFLON" although other materials may be profitably employed which are chemically and physically stable at the operating temperatures and pressures of the piston, sufficiently deformable under compression to be capable of filling said space as completely as possible (bearing in mind the possible presence of said shell) but sufficiently viscous to render impossible in operation any escape of said fluid in the operational clearance between the partly spherical rod head or shell and said cylindrical bearing surface. It may in particular concern an oil having high viscosity, of the type employed for example in viscous dampers (or vibration shock absorbers). Thus, it can in particular be seen that said definition of the fluid excludes in particular oils having low or even medium viscosity.

In this way, irrespective of the position of the rod relative to the piston, the forces exerted on the latter are uniformly transmitted to the partly spherical head of the rod through the cushion formed by said plastically-deformable fluid, which is prevented from flowing out of the space provided therefor. Owing to the fact that the shell (in the preferred case in which this shell exists) is movable in a direction parallel of the axis of the cylindrical bearing surface, this shell is subjected to practically only compression in a direction perpendicular to its surface and it is therefore protected against risks of fracture or piercing, the axial movement of the shell enabling clearance to be taken up automatically.

Note that the aforementioned French patent No. 1,547,151 proposes disposing a layer of plastics material, such as PTFE, directly between the partly spherical seat of a piston and the partly spherical head of a connecting rod, but on the side opposed to that on which it is provided in accordance with the present invention and for a completely different purpose. It should also be noted that it is known to provide with synthetic resin, such as PTFE, both the male and female parts of a ball joint, for example for vehicle steering mechanisms (see U.S. Pat. No. 3,342,513) so that the elements moving in contact with each other are both composed of synthetic resin.

Preferably, the metal shell according to the invention is made from bronze, in particular beryllium bronze, or other metal or alloy having a good coefficient of friction in limit lubrication and a high ductility and its thickness is generally between 1% and 3% of the diameter of the partly spherical head of the rod.

In the case of the second aspect of the invention defined hereinbefore, the shell is advantageously so arranged that its substantially hemispherical part bears against the spherical head of the rod along a closed, circular line or band of contact located in, or defined in its upper part by, a plane passing above the center of the rod head and preferably perpendicular to the axis of the piston; unidirectional means for supplying lubricating oil under pressure communicating on the upstream side through a check-valve with an oil passage provided in the rod, opening onto an interstice defined, above said line or band of contact, by the surface of the partly spherical head and by the inner surface of the partly hemispherical part of the metal shell, the pressure of the lubricating oil, on the upstream side of said check-valve being higher, at least during a part of the operating cycle of the engine, than the pressure prevailing in said interstice; and the space located below said line or band of contact, between the partly spherical head and the shell, communicates with a zone of low pressure which is lower than the maximum pressure prevailing in said interstice.

This permits incorporating the metal shell in means supplying with lubricating oil under pressure the surface of the partly spherical head of the rod which must be capable of freely pivoting with respect to the inner surface of said shell. Various embodiments of said interstice and of said lubricating oil supply means will be described in detail hereinafter.

Preferably, in the preferred case where the metal shell is provided, the partly spherical head of the rod or the metal shell is provided, on the side thereof facing toward the rod head, with grooves or oil ways for distributing the lubricating oil introduced, in the known manner or as indicated hereinbefore, between this shell and the rod head. It must be stressed that these oil ways avoid the risk of being clogged up by the PTFE or other like substance or fluid since they are provided on surfaces which are not in contact with this substance or fluid.

In the absence of said shell, lubricating oil under pressure may nonetheless be supplied to an annular chamber partly defined by the rod head, as described hereinafter, so as to promote by entrainment the formation of a film of lubricating oil on this head.

The invention will now be described in more detail with reference to the accompanying drawings.

FIG. 1 of these drawings partly represents, in axial section, the assembly of a piston according to a first embodiment of the invention and the corresponding connecting rod.

Figure 9:
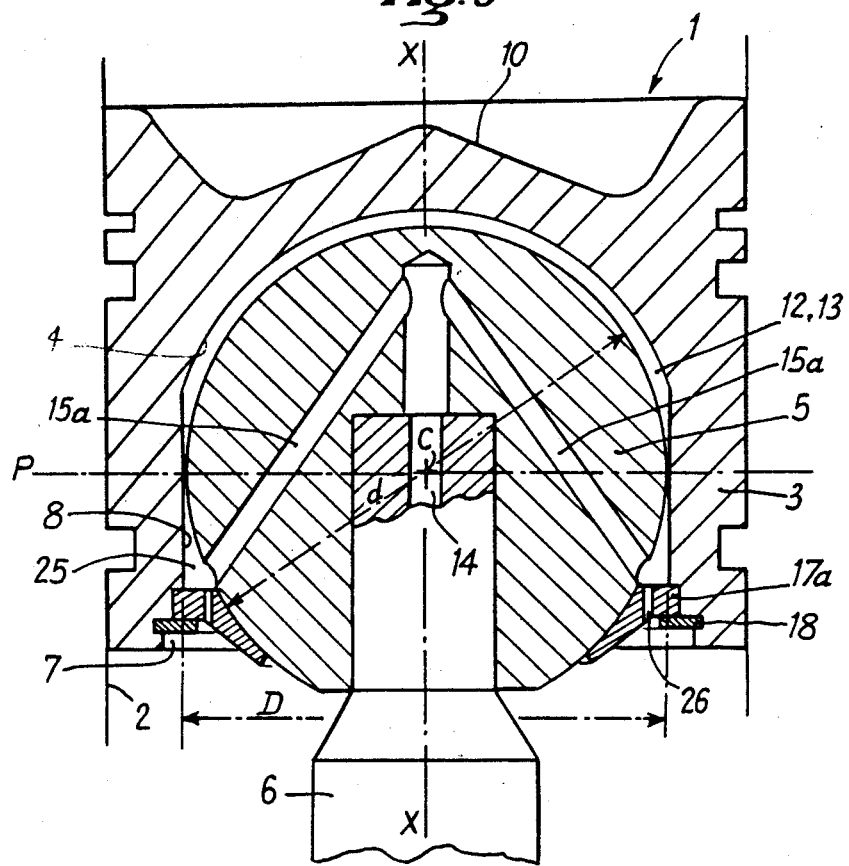

FIG. 9 partly represents, in axial section, the assembly of a piston according to a third embodiment of the invention, and of the corresponding connecting rod.

FIG. 10 partly represents, in axial section, the assembly of a piston according to a fourth embodiment of the invention, and of the corresponding connecting rod.

FIGS. 11 and 12 illustrate lubricating means arranged in two different ways, respectively.

Figure 13:
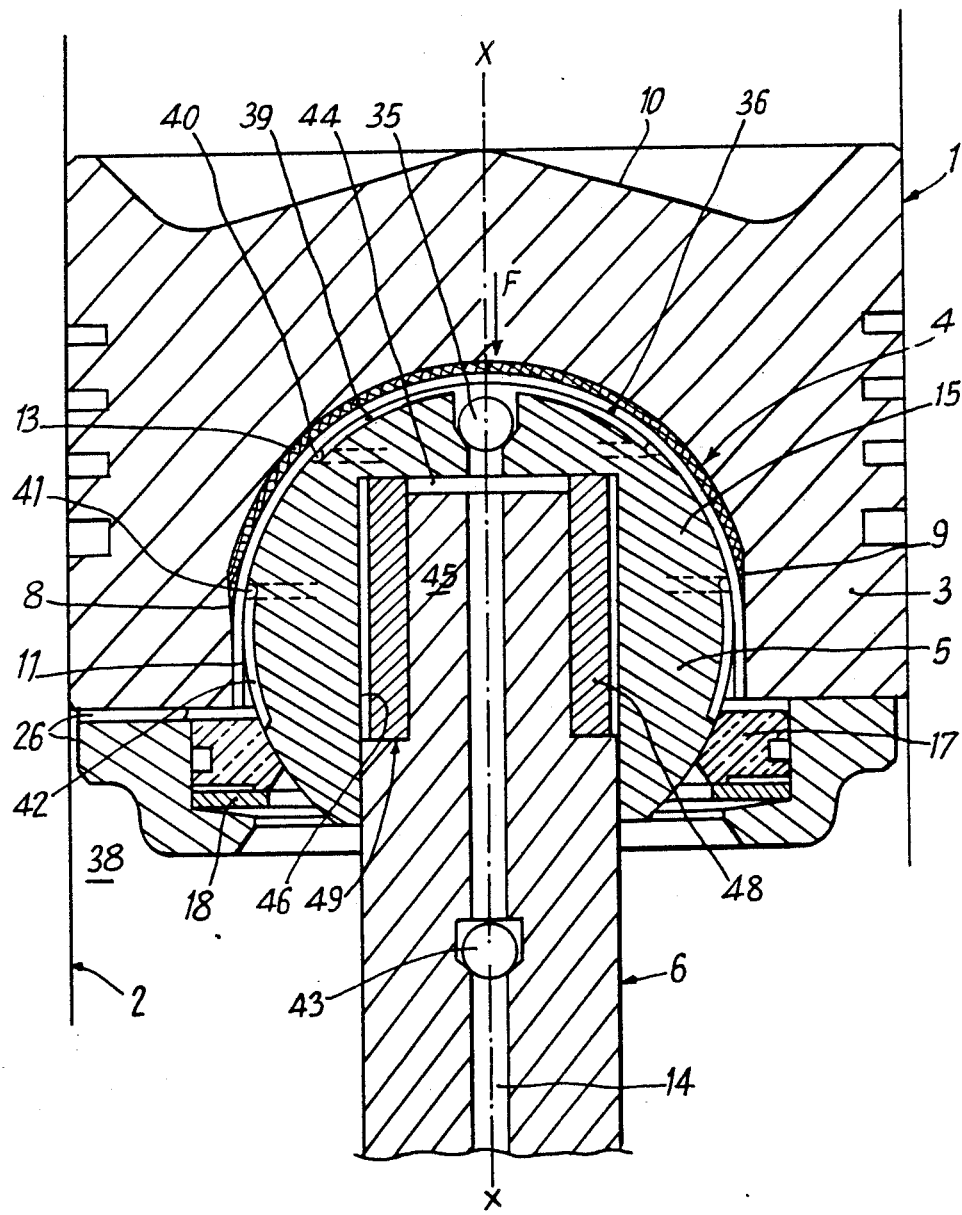

FIGS. 13 and 14 illustrate a first modification of the embodiment of FIG. 12, respectively by an axial sectional view and by a top plan view of the rod head.

FIG. 15 illustrates a second modification of the embodiment of FIG. 12.

The piston according to a first embodiment of the invention (FIGS. 1 and 2), generally designated by the reference character 1, is adapted to slide in a cylinder 2. The working gas is contained in this cylinder 2 by the transverse surface 10 of the piston 1.

Within an externally cylindrical skirt 3 (the term "cylindrical" of course does not exclude the presence of grooves for piston rings or the like), the piston 1 has a partly spherical bearing surface 4 adapted to receive, in the manner of a ball joint, the partly spherical head 5 of a connecting rod 6.

Figure 3:
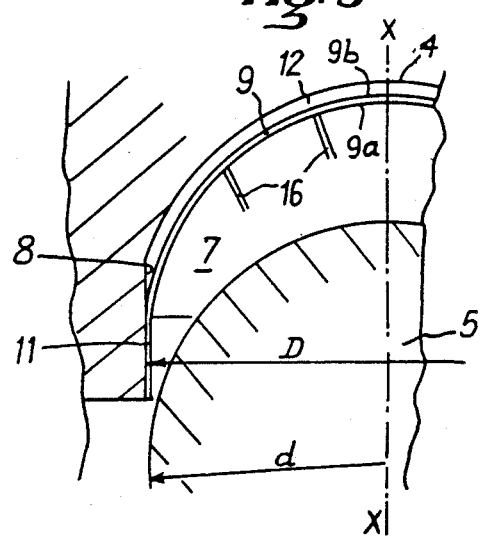
FIG. 3 represents the details of the parts forming a ball joint between the piston and the rod before the assembly thereof.

According to the invention, the piston has an inner cavity 7 (see FIG. 3) at least partly defined by a cylindrical bearing surface of revolution 8 which is preferably (but not necessarily) coaxial with said skirt 3 (the common axis being designated by X—X), the diameter D of this cylindrical bearing surface being slightly larger than the diameter d of the head 5. The cavity 7 is open at the end adjacent to the bottom of FIG. 1, i.e., at the end opposed to the transverse surface 10. The bearing surface 4 is constituted in the upper part thereof (according to FIGS. 1 and 3) by a surface 9a of the approximately hemispherical surfaces of a thin metal shell 9 which has a concavity facing away from said transverse surface 10 of the piston 1, i.e., downwardly in FIGS. 1 and 3, and is maintained in position by an interference fit in the cylindrical bearing surface 8. The space 12 defined within the cavity 7 by the other surface 9b of the surfaces of the shell 9 is filled with a viscous, pasty or plastically-deformable fluid 13 which is practically incompressible at the operating temperatures and pressures of the piston 1.

As mentioned hereinbefore, the fluid or substance 13 is advantageously polytetrafluoroethylene or an equivalent paste.

The advantage of the cylindrical shape of revolution of the bearing surface 8 cooperative with the partly spherical shape of the rod head 5 and of the magnitude of the diameter D thereof is revealed by the comparative diagrams of FIGS. 4 to 7 in which the metal shell 9 has been omitted either to render the drawing more clear when this shell exists, or to take into account the embodiment described hereinafter (FIG. 9) in which this shell 9 is eliminated.

Indeed, if the diameter D of the cylindrical bearing surface 8 is too small (FIG. 4), there is a metal-to-metal contact between the head 5 and the edge of the cylindrical bearing surface 8 and there is no hydrostatic pressure in the fluid or substance 13.

Figure 5:
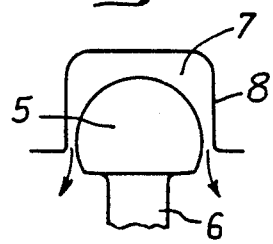
Figure 7:
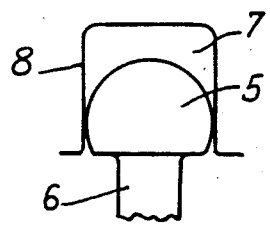

If the diameter of the cylindrical bearing surface 8 is too large (FIG. 5), lateral leakages of the substance 13 will occur, as shown diagrammatically by the arrows in FIG. 5.

If the entrance diameter of the cavity 7 is correct but if the lateral bearing surface 8 of this cavity is not cylindrical (FIG. 6), there is no taking up of the clearance which may result from wear, from a differential deformation (elastic or non-elastic), or from a differential expansion, and lateral leakages will in the end occur, as in the case of FIG. 5.

If the cavity 7 is arranged in accordance with the invention (FIG. 7), the clearances are automatically taken up.

According to a preferred embodiment, the metal shell 9 is made from bronze, in particular beryllium bronze, or other metal or alloy having a good coefficient of friction in limit lubrication and a high ductility, it being understood that conventional means, diagrammatically represented by the passages 14 and 15 respectively extending through the rod 6 and the head 5 are provided for introducing lubricating oil under pressure between the outer surface of the head 5 and the surface 9a of the shell 9.

Preferably, the partly spherical head 5 (FIG. 2) or the shell 9 (FIG. 3), on its surface 9a, is provided with grooves or oil ways 16.

Figure 1:
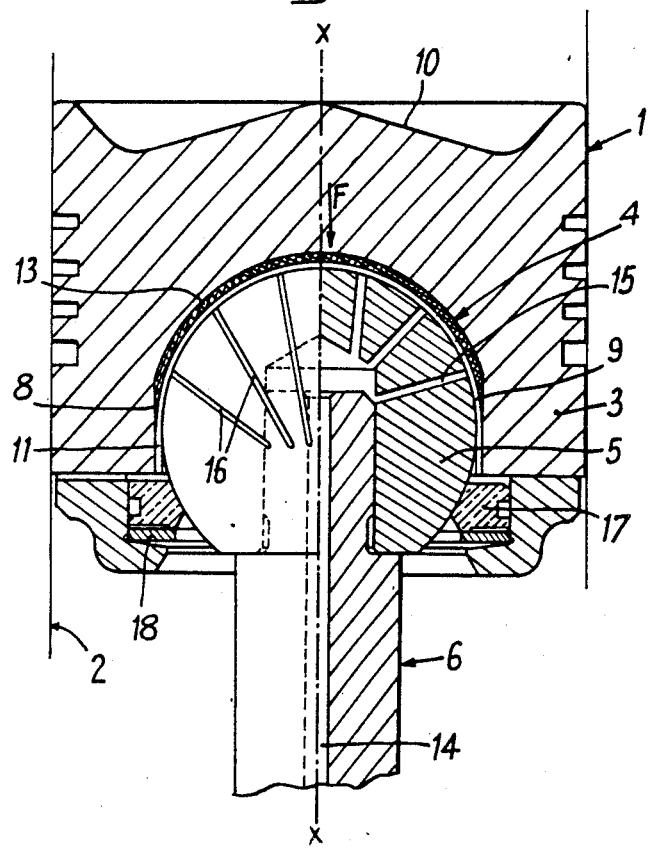

In this way, there is obtained piston whose production will be clear from the foregoing and in which there is introduced in the bearing surface 4 the head 5 of the connecting rod 6, the latter being thereafter maintained in position, at least on a piston for a four-stroke internal combustion engine, for example by a rigid ring 17 elastically yieldably biased upwardly in FIG. 1 by an elastically yieldable ring 18 which bears externally against the piston 1. On a piston for a two-stroke internal combustion engine, the maintaining means such as the rings 17, 18 may be dispensed with, since the forces are always exerted in the same direction on the piston in the course of the operating cycle of the engine.

In operation, the force developed on the upper surface of the piston 1 by the pressure of the working gas is uniformly distributed over the head 5 by the cushion constituted by the substance 13.

Figure 8:
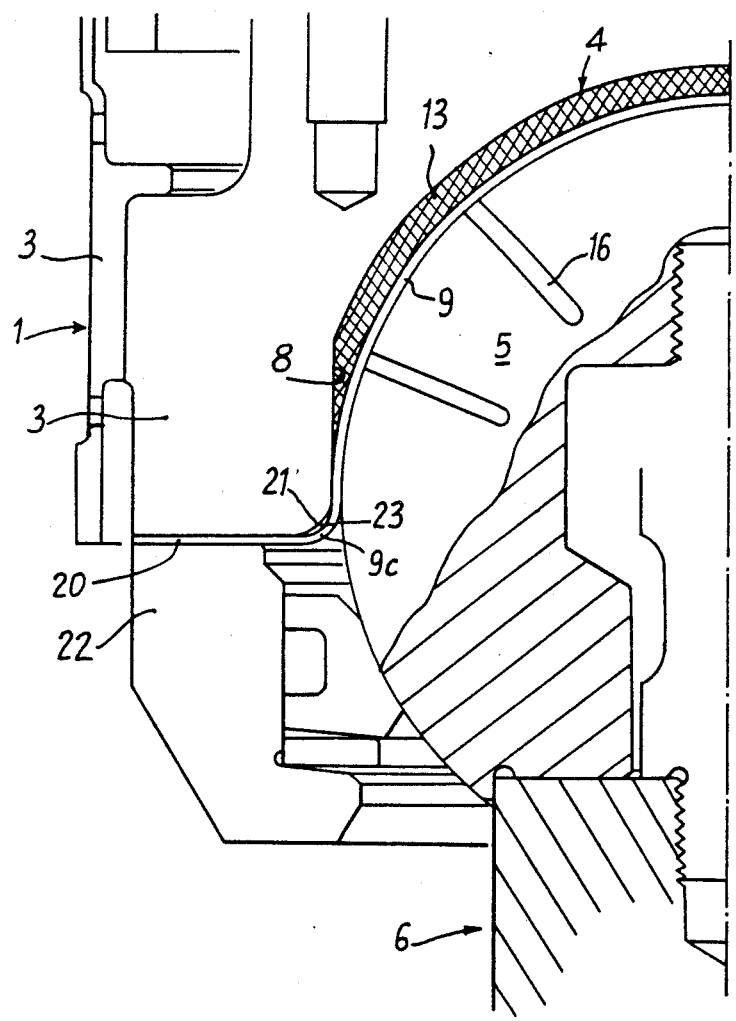
FIG. 8 represents, in a semi-axial section, the assembly of a piston according to a second embodiment of the invention and of the corresponding connecting rod.

As shown diagrammatically in FIGS. 1 and 8, the metal shell 9 may be maintained in position by an interference fit in the cylindrical bearing surface 8 of the piston 1, provided this shell is capable of moving in a direction parallel to the axis X—X of this cylindrical bearing surface under the effect of forces exceeding a given limit.

According to the embodiment of FIG. 1, the shell 9, whose hemispherical part is extended by a cylindrical skirt 11 in contact with the cylindrical bearing surface 8 of the piston 1, is mounted in the piston 1 with no other fixing means than its interference fit between the head 5 and the cylindrical bearing surface 8 of the piston, this interference being due to an appropriate choice of the thickness (at rest) and/or of the outside diameter of the shell 9 and of the difference between said diameters D and d. This thickness is generally between 1% and 3% of the diameter d of the head 5.

According to the embodiment of FIG. 8, the hemispherical part of the shell 9 is followed by a highly flared skirt 20 which is retained between the base of the skirt 3 of the piston 1 and a ring 22 which is fixed to this skirt base by suitable means, such as screws. To enable the shell 9 to move in a direction parallel to the axis X—X, the base of the skirt 3 of the piston 1 is provided with a rounded surface 21 and the dimensions of the shell 9, and in particular of the skirt 20 thereof, are so determined, bearing in mind the volume of the fluid or substance 13, that a clearance 23 is provided at rest between the rounded surface 21 and the confronting part 9c of the shell 9, this clearance enabling the part 9c to be deformed without being subjected to tensile forces when the shell 9 moves axially with respect to the cylindrical bearing surface 8 of the piston 1.

Figure 2:
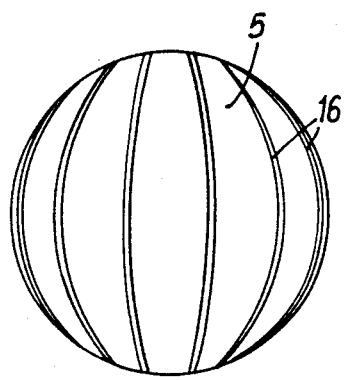
FIG. 2 represents the partly spherical head of the rod as viewed in the direction of arrow F of FIG. 1.
Figure 4:
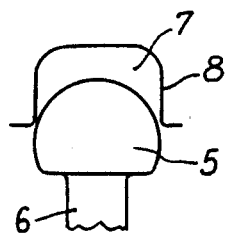
FIGS. 4 to 7 are comparative diagrams illustrating certain advantages of the invention.
Figure 6:
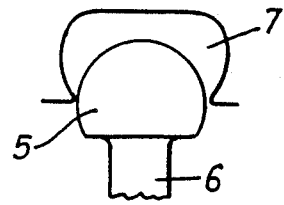

The embodiment of FIG. 9 differs from those of FIGS. 1-2 and 8 by the absence of the shell 9 between the partly spherical head 5 of the connecting rod 6 and the cylindrical bearing surface 8 of the piston 1. In other words, the deformable substance 13 is in direct contact with the head 5 and is prevented from escaping from the cavity 7 merely by the choice of the clearance provided between the head 5 and the cylindrical bearing surface 8 (or, which amounts to the same thing, the choice of the difference between said diameters D and d), bearing in mind the characteristics of viscosity of the substance 13.

Preferably, the ratio between the area of the diametrical section of the partly spherical head 5 and the area of the cross-section (measured in the direction perpendicular to the axis X—X) of piston 1 is greater than or equal to 0.5, which advantageously limits the pressure stresses produced in operation on the substance 13 and the head 5. This characteristic applies also advantageously in the presence of a shell 9, although the diagrammatic representations of FIGS. 1 and 8 do not illustrate this.

According to the embodiment of FIG. 9, the oil ways such as those designated by the reference character 16 in FIGS. 1, 2 and 8 are not to be envisaged since they would become plugged up with the substance 13 and would tend to encourage its migration out of the space provided therefor. In this case, the passage 14 for supplying lubricating oil under pressure provided in the connecting rod 6 communicates with passages 15a extending through the connecting rod head 5 and permanently opening out below the "equatorial" plane P (according to FIG. 9) perpendicular to the axis X—X and passing through the center C of the partly spherical surface of the head 5, onto an annular chamber 25 defined, below said plane P, by a ring 17a which is similar to the ring 17 of FIG. 1 but provided with outlet orifices such as 26 for the lubricating oil which reaches the chamber 25 through the passages 14 and 15a. The circulation of oil achieved in this way ensures, on one hand, an intense cooling of the rod head 5 and possibly of the piston 1 and, on the other hand, the maintenance, by the effect of entrainment, of a film of lubricating oil on the rod head 5.

In any case, the height of the cylindrical bearing surface 8 must be sufficient to allow accommodating the axial travel of the head 5 of the rod 6 relative to the piston 1 which corresponds to:

the differential thermal expansion (due to the difference between the coefficients of expansion), and/or
the compressibility of the substance 13, and/or
the manufacturing tolerances, and/or
wear phenomena.

In the foregoing, it has been assumed that the fluid 13 was constituted by PTFE. Notwithstanding its obvious advantages, this substance has certain drawbacks. In particular, small or very small deformations of the shell 9 (when the latter exists) are liable not to be followed on the side of the cushion formed by the PTFE. Moreover, the transverse relaxation time of a deformation is relatively long.

In some cases, it is advantageous, for overcoming the defects of PTFE, to replace the latter by a liquid having high viscosity, such as silicone oils employed in viscous dampers, preferably in combination with a shell 9 which is subjected, in operation, to a cyclic deformation. This is illustrated in FIG. 10 in which the space 12 has been filled from the bottom (in the filling position) to avoid any air bubble, with an oil 13 having a high viscosity through an orifice 27 which was subsequently closed by a plug or pointed screw 28. In the course of this filling, the air escapes in the upper part (in the filling position) of the space 12 through a purge orifice 31 which is subsequently closed by a plug or pointed screw 32. The space 12 terminates at a short distance below the equatorial plane P in a rounded portion 29 (and not by a chamfer). Indeed, it is necessary to bring down to the equatorial plane P, the hydrostatic pressure of the cushion constituted by the viscous liquid 13 by giving thickness to this cushion down to this plane P. An annular sealing element 30 is disposed in a groove provided in such manner in the piston 1 that it opens onto the cylindrical bearing surface 8 below said rounded portion 29 but as close as possible to the equatorial plane P so that the hydrostatic pressure does not move the shell 9 away from the cylindrical bearing surface 8 and thereby result in a leakage of the viscous liquid 13. It is nonetheless necessary to arrange that the space 12 have a relatively small thickness, on the order of for example 2 mm, so that it is possible to neglect the effect of the compressibility of the oil 13 of high viscosity and this oil can consequently be considered to be practically incompressible at the operating temperatures and pressures according to the general definition provided at the beginning of this description.

There will now be described the means for taking advantage of the presence of the shell 9 for maintaining a film of lubricating oil between this shell 9 and the rod head 5.

According to the invention and as illustrated in FIG. 11, for forming said means the shell 9 is so arranged that its substantially hemispherical part 9a, 9b bears against the partly spherical head 5 of the connecting rod 6 along a closed circular line of contact 33 located in a plane Q extending above (according to the convention explained in the preamble) the center C of the head of the connecting rod 5 and preferably perpendicularly to the axis X—X of the piston 1. According to a modification, the shell 9 may bear against the head 5 along a circular band 34 defined in its upper part by the line 33 and/or the plane Q. Unidirectional means for supplying lubricating oil under pressure communicate on the upstream side through a check-valve 35 with the passage 14 provided in the connecting rod 6 and opening onto an interstice 36 defined by the parts of the rod head 5 and the shell 9 which are located above said line of contact 33 (or band of contact 34). The assembly is arranged in such manner that the pressure of the lubricating oil on the upstream side of the check-valve 35 exceeds, at least during a part of the compression-expansion cycle of the working gas, the pressure prevailing in the interstice 36. Finally the space 37 between the rod head 5 and the shell 9 below the line or band of contact 33 or 34, communicates with a discharge zone 38 at low pressure, i.e. at a pressure lower than the maximum pressure prevailing in the interstice 36. In the case where a ring 17a, similar to the ring of FIG. 9, is provided for maintaining the head 5 inside the piston 1, at least one orifice or passage 26 must extend through or around this ring 17a in order to permanently put the space 37 in communication with the discharge zone 38. Indeed, if the space 37 were fluidtight, the lubricating oil would stagnate in the interstice 36.

Preferably, and as shown in FIGS. 13 and 14, the interstice 36 is essentially constituted by the space between the shell 9 and the rod head 5 and located above their line or band of contact 33 or 34 and by a network of grooves, such as 39, which are provided on at least one of the confronting surfaces of the shell 9 and the rod head 5 and communicate with the outlet of the unidirectional lubricating oil supply means, i.e. with the downstream side of the check-valve 35. In order to simplify the drawing, there has been shown in FIG. 11 only said space between the shell 9 and the rod head 5 and the line of contact 33 and the band of contact 34, the latter being also shown in FIG. 14. Preferably, the width of the grooves 39 and others is approximately equal to the thickness of the shell 9. In general, the grooves 39 are meridian grooves passing through this intersection and leading to said line or band of contact 33, 34. As for the plane P termed the "equatorial" plane, the term "meridian" is employed here in likening the rod head 5 to a globe of the earth, the polar line of which would constitute the axis of the connecting rod 6 and would coincide with the axis X—X of the piston 1 when, as shown for example in FIG. 13, the rod 6 is placed on the axis of the piston 1.

As shown in FIGS. 14 and 15, said outlet of the unidirectional means for supplying lubricating oil under pressure is located at the intersection of the partly spherical surface of the rod head 5 and the axis X—X of the piston 1, irrespective of the relative angular position of the rod 6 and the piston 1 and the grooves 39 pass through this intersection and lead to said line of contact 33 or the upper limit of the band of contact 34.

In addition to the meridian grooves 39, at least one other groove 40 is provided on the rod head 5 in a meridian plane perpendicular to the axis X—X of the piston 1 above the line or band of contact 33, 34 or at the upper limit of this band of contact 34. At least one other groove 41 is provided on the head 5 in a plane perpendicular to the axis X—X of the piston 1 below the line or band of contact 33, 34 or at the lower limit of this band of contact 34. Other grooves 42 of these grooves may also be provided below this band of contact 34 in meridian planes. As a modification, the grooves 39, 40 and 41 could be placed on the inner surface 9b of the shell 9, their situation being the same as the situation of the grooves provided preferably on the rod head 5, at least when the rod 6 is aligned with the piston 1.

According to the arrangement illustrated in FIG. 11, sufficiently small values are given to the thickness of the shell 9 and the stiffness of the material from which it is made so that the quasi-hemispherical upper part 9a, 9b of the shell 9 perfectly marries up with the spherical outer shape of the rod head 5 by elastic deformation when the resultant of the forces applied to the piston 1 is maximum so as to expel the oil trapped in the interstice 36 through said line or band of contact 33, 34 while forming a hydrostatic film adjacent to said discharge zone 38, and sufficiently large values to ensure that the shell 9 resumes its initial shape when the resultant of the forces applied to the piston 1 is minimum so as to cause the pressure prevailing in the interstice 36 to drop to a value below that of the pressure of the oil supplied, through the check-valve 35, by the unidirectional oil supply means.

During the reciprocating movements of the piston, the quasi-hemispherical part of the shell 9 thus performs the function of diaphragm of a diaphragm pump, the intake strokes of this pump being due to the enlargement of the interstice 36 and the discharge strokes to its shrinkage by elastic deformation of the shell 9.

In this case, the shell 9 may be formed in the following manner:

(a) In the case of a shell having a quasi-hemispherical shape at rest in its upper part, the shell 9 may be formed by a press operation in a die which imparts thereto the required shape, it being then possible to make the rod head 5 perfectly spherical (except, of course, in its lower part by which it is connected to the rod 6).

The drawback of this solution is that the interstice 36 is fixed relative to the piston 1 and requires grooves for supplying oil to this interstice from the oil outlet which is fixed relative to the rod 6.

(b) In the case of a shell which is hemispherical at rest in its upper part, the rod head 5 may be so machined as to provide the interstice 36 around the oil outlet. This machining, for example by a digital control machine, may be effected by turning a member of revolution. It is then possible to dispense with the grooves referred to in the preceding paragraph.

According to a second arrangement illustrated in FIGS. 12 to 15, the unidirectional means for supplying oil under pressure are formed by a piston pump incorporated in the assembly of the connecting rod 6 and the rod head 5 which draws oil through an inlet valve 43 and discharges the oil through said check-valve 35.

In an advantageous construction, said pump is formed by a cavity 44 of variable volume located between the inlet valve 43 and the check-valve 35 and defined by the body of the connecting rod 6 whose upper part 45 is so arranged as to form a piston which is axially slidable in a bore 46 provided in the rod head 5. A spring is interposed between the body of the rod 6 and the rod head 5.

The compression travel of this spring is sufficient to permit the pressure of the oil trapped in said cavity 44 between the two valves 35, 43, to exceed the pressure exerted in said interstice 36 during at least a part of the compression-expansion cycle of the working gas, the length of the spring being large enough to ensure that its relative compression does not exceed the elastic deformation and fatigue limits of the material from which the spring is made, the stiffness to the spring being small enough to enable the spring to be compressed in such manner as to put the bearing surfaces of the rod head 5 and the body of the rod 6 in contact with each other while the resultant of the forces applied against the piston 1 is at the most maximum and large enough to ensure that the spring can extend while the resultant of the forces applied against the piston is at least minimum.

According to the simplest embodiment shown diagrammatically in FIG. 14, the spring in question is a simple coil spring 47. Mechanical means (not shown) limit the travel of the rod head 5 in the direction away from the rod 6.

According to the more elaborate embodiments shown in FIGS. 13 to 15, said spring is formed by a metal bar, preferably composed of titanium.

According to the embodiment of FIG. 13, the metal bar, here designated by the reference character 48, has a tubular shape and surrounds the end part 45 of the body of the connecting rod 6. This part 45 has a reduced cylindrical shape relative to the adjacent part of the body of the rod 6 so as to provide an annular shoulder 49 against which bears one of the axial ends of the tubular bar 48.

According to the variant of FIG. 15, the metal bar, here designated by the reference character 50, has a solid shape apart from a longitudinal passage 51 which extends therethrough in the extension of the passage 14 in the rod 6.

Whatever embodiment is adopted, the relative contraction of the bar 48 or 50 is on the order of 0.25%, its cross-section representing preferably about 3% of the cross-section of the piston 1.

A metal bar such as 46 or 50, which may normally be considered rigid, can act as a spring if its cross-section is small enough relative to the compression stresses exerted thereon, but large enough to remain within the domain of elastic compression of the metal from which it is made. The advantage of the metal bar over the spring 47 of FIG. 12 resides in its reduced overall size and in the reduction in the harmful empty spaces. The choice of titanium in preference to steel is justified by the fact that its Young's modulus ($11.3 \times 10^5$ bars) is about one half of that of steel ($22 \times 10^5$ bars). For a given stress, the compression travel of the bar 46 or 50 is twice that of a bar of steel or, for a given compression travel, the length of a bar of titanium is one half of the length of a bar of steel.

I claim:

1. A piston for sliding in cylinders of reciprocating two-stroke or four-stroke internal or external combustion engines and compressors, i.e. machines in which the working gas contained in the or each cylinder (2) by a transverse surface (10) of the piston (1) is at both high pressure and high temperature, which piston (1) has, within an externally cylindrical skirt (3), a partly spherical bearing surface (4) for receiving in the manner of a ball joint a partly spherical head (5) of a connecting rod (6), characterized in that said piston comprises an inner cavity (7) open at an end opposed to said transverse surface (10) and laterally defined at least partly by a cylindrical bearing surface of revolution (8); in that a space (12) defined inside the cavity (7) by the partly spherical head (5) of the rod (6) is filled with a fluid (13) which is practically incompressible and which is viscous, pasty or plastically deformable at the high operating temperatures and pressures of the piston (1); and in that the diameter (D) of the cylindrical bearing surface (8) is very slightly larger than the diameter (d) of the partly spherical head of the rod (6) so that the operational clearance between said cylindrical bearing surface (8) and said partly spherical head (5) is small enough to prevent any migration of said fluid (13) out of said space at the operating temperatures and pressures of the piston.

2. A piston according to claim 1, characterized in that the generatrices of said cylindrical bearing surface (8) are parallel to the generatrices of the cylindrical skirt (3) of the piston (1), said cylindrical bearing surface (8) being generally coaxial with said skirt (3).

3. A piston according to claim 1, characterized in that it comprises a thin metal shell (9) interposed between the partly spherical head (5) of the rod (6) and said fluid (13) and maintained locally by an interference fit in said cylindrical bearing surface (8), the assembly being such that the part of the shell (9) which is an interference fit in said cylindrical bearing surface (8) is movable in a direction parallel to the axis of the cylindrical bearing surface (8) under the effect of forces exceeding a given limit.

4. A piston according to claim 3, characterized in that the metal shell (9) is made from bronze, and has a good coefficient of friction in limit lubrication and high ductility.

5. A piston according to claim 4, characterized in that the partly spherical head (5) of the rod (6) or the metal shell (9), on the surface (9a) thereof facing toward the rod head (5), is provided with grooves or oil ways (16) adapted to distribute lubricating oil introduced between the shell (9) and the rod head (5).

6. A piston according to claim 3, characterized in that the shell (9) is only mounted in the piston (1) by the interference fit thereof in the cylindrical bearing surface (8) of the piston (1).

7. A piston according to claim 3, characterized in that the shell (9) comprises a hemispherical part followed by a highly flared skirt (20) which is retained against the base of the skirt (3) of the piston (1), the assembly being such that a clearance (23) is provided at rest between the base of the skirt (3) of the piston (1) and the confronting part (9c) of the shell (9).

8. A piston according to claim 3, characterized in that the thickness of the shell (9) is between 1% and 3% of the diameter (d) of the partly spherical head (5) of the rod (6).

9. A piston according to claim 1, characterized in that said fluid (13) is formed by a fluorine polymer.

10. A piston according to claim 1, characterized in that said fluid (13) is formed by an oil of high viscosity of the type employed for example in viscous dampers.

11. A piston according to claim 1, characterized in that the ratio between the area of the diametrical section of the partly spherical head (5) and the area of the cross-section of the piston (1) is greater than or equal to 0.5.

12. A piston according to claim 3, characterized in that the shell (9) has a substantially hemispherical part thereof which bears on the partly spherical head (5) of the rod (6) along a closed circular line or band of contact (33 or 34) contained in, or defined in the upper part thereof by a plane (Q) extending above the center (c) of the rod head (5) and perpendicular to the axis (X—X) of the piston (1); in that unidirectional means for supplying lubricating oil under pressure communicating on the upstream side, through a check-valve (35), with an oil passage (14) provided in the rod (6), open onto an interstice (36) defined by the parts of the surface of the rod head (5) and of the shell (9) located above said line or band of contact (33,34), the pressure of the lubricating oil, on the upstream side of said check-valve (35), exceeding, at least during a part of the compression-expansion cycle of the working gas, the pressure prevailing in said interstice (36); and in that the space (37) between the rod head (5) and the shell (9), below said line or band of contact (33,34), communicates through an outlet with a discharge zone (38) at low pressure which is lower than the maximum pressure prevailing in said interstice (36).

13. A piston according to claim 12, characterized in that said interstice (36) is essentially constituted by the space between the shell (9) and the rod head (5) and located above the line or band of contact (33,34), and by a network of grooves (39,40,41,42) which are provided on at least one of the confronting surfaces of the shell (9) and the rod head (5), the width thereof being in the neighborhood of the thickness of the shell (9), which grooves (39,40,41,42) communicate with the outlet of the unidirectional lubricating oil supply means.

14. A piston according to claim 13, characterized in that said outlet of the unidirectional means for supplying lubricating oil under pressure is located at the intersection of the partly spherical surface of the rod head (5) and the axis (X—X) of the piston (1) and in that at least some of said grooves (39) are meridian grooves passing through said intersection and leading to said line or band of contact (33,34).

15. A piston according to claim 13, characterized in that at least one (40) of said grooves is provided on the partly spherical surface of the rod head (5) in a plane perpendicular to the axis (X—X) of the piston (1).

16. A piston according to claim 13, characterized in that at least some (41,42) of said grooves are provided on the partly spherical surface of the rod head (5) below said line or band of contact (33,34) and in meridian planes.

17. A piston according to claim 12, characterized in that the thickness of the shell (9) and the stiffness of the material of which it is made are of sufficiently low value to ensure that the quasihemispherical upper part (9a,9b) of the shell (9) perfectly marries up, by an elastic deformation, with the outer shape of the partly spherical surface of the rod head (5) when the resultant of the forces applied to the piston (1) is maximum so as to expel the oil trapped in said interstice (36) through said line or band of contact (33,34) by forming a hydrostatic film, toward said discharge zone and of sufficiently high value to ensure that the shell (9) resumes its initial shape when the resultant of the forces applied to the piston (1) is minimum so as to cause the pressure prevailing in the interstice (36) to drop to a value lower than the value of the pressure of the oil supplied by the unidirectional oil supply means.

18. A piston according to claim 12, characterized in that the unidirectional means for supplying oil under pressure is constituted by a piston pump which draws the oil in through an inlet valve (43) and discharges the oil through said check-valve (35).

19. A piston according to claim 18, characterized in that said pump is constituted by a cavity (44) of variable volume located between said inlet valve (43) and said check-valve (35) and defined by the body of the connecting rod proper whose upper part (45) is so arranged as to form a piston which is axially slidable in a bore (46) provided in the partly spherical rod head (5) and in that a spring (47) is interposed between said body of the rod and said partly spherical rod head (5).

20. A piston according to claim 19, characterized in that the compression travel of the spring (47) is sufficient to permit the pressure of the oil trapped in said cavity (44) between the two valves (35,43) to exceed the pressure prevailing in said interstice (36) during at least a part of the compression-expansion cycle of the working gas, the length of the spring (47) being sufficient to ensure that the relative compression thereof does not exceed the limits of elastic deformation and fatigue of the material from which the spring is made, the stiffness of the spring being sufficiently low to ensure that the spring is capable of being compressed in such manner as to put the bearing surfaces of the rod head (5) and the body of the rod (6) in contact while the resultant of the forces applied to the piston (1) is at the most maximum and sufficiently large to ensure that the spring is capable of extending while the resultant of the forces applied to the piston (1) is at least minimum.

21. A piston according to claim 20, characterized in that said spring is formed by a metal bar (48,50).

22. A piston according to claim 21, characterized in that the material of the bar (48,50) is titanium.

23. A piston according to claim 22, characterized in that the relative contraction of the bar (48,50) is 0.25%.

24. A piston according to claim 22, characterized in that the cross-section of the bar (48,50) represents about 3% of the cross-section of the piston (1).

25. A piston for sliding in the cylinders of reciprocating two-stroke or four-stroke internal or external combustion engines and compressors, i.e. machines in which a working gas contained in the or each cylinder (2) by a transverse surface (10) of the piston (1) is at both high pressure and high temperature, which piston (1) receives in the manner of a ball joint a partly spherical head (5) of a connecting rod (6), characterized in that said piston comprises, within an externally cylindrical skirt (3), an inner cavity (7) which is open at an end opposed to said transverse surface (10) and laterally defined at least partly by a cylindrical bearing surface of revolution (8) which is coaxial with the piston (1); in that there is placed in said cavity (7) a thin fluidtight metal shell (9) whose shape is cylindrical in a lower part (11) thereof, which is an interference fit in the cylindrical bearing surface (8) of revolution of the piston (1) and substantially hemispherical in an upper part thereof against which bears the rod head (5); in that the metal shell defines, by an outer surface (9b) of the substantially hemispherical part thereof, inside the inner cavity (7) of the piston (1), a space (12) filled with a viscous, pasty or plastically-deformable fluid which is practically incompressible at the operating temperatures and pressures of the piston (1); and in that the outside diameter (d) of the partly spherical head (5) of the rod (6) is slightly less than the diameter (D) of the cylindrical bearing surface (8) of the piston (1) so that the cylindrical part (11) of the shell (9) is an interference fit in the aforementioned manner and any migration of said fluid out of said space (12) is prevented at the operating temperatures and pressures of the piston (1).

* * * * *